US012652409B2

(12) United States Patent
Shor

(10) Patent No.: US 12,652,409 B2
(45) Date of Patent: Jun. 9, 2026

(54) COMBINED COMPRESSION AND FEATURE EXTRACTION MODELS FOR STORING AND ANALYZING MEDICAL VIDEOS

(71) Applicant: Verily Life Sciences LLC, South San Francisco, CA (US)

(72) Inventor: Joel Shor, Somerville, MA (US)

(73) Assignee: Verily Health Inc., Dallas, TX (US)

( * ) Notice: Subject to any disclaimer, the term of this patent is extended or adjusted under 35 U.S.C. 154(b) by 109 days.

(21) Appl. No.: 18/240,783

(22) Filed: Aug. 31, 2023

(65) Prior Publication Data

US 2024/0129515 A1 Apr. 18, 2024

Related U.S. Application Data

(60) Provisional application No. 63/410,522, filed on Sep. 27, 2022.

(51) Int. Cl.
*G06V 20/40* (2022.01)
*G06T 7/73* (2017.01)
(Continued)

(52) U.S. Cl.
CPC .............. *H04N 19/50* (2014.11); *G06T 7/73* (2017.01); *G06V 10/774* (2022.01); *G06V 10/82* (2022.01); *G06V 20/46* (2022.01); *H04N 19/136* (2014.11); *H04N 19/147* (2014.11); *H04N 19/184* (2014.11); *H04N 19/436* (2014.11); *G06T 2207/10016* (2013.01);
(Continued)

(58) Field of Classification Search
None
See application file for complete search history.

(56) References Cited

U.S. PATENT DOCUMENTS 10,860,929 B2 * 12/2020 Rippel ................. H04N 19/182
11,082,720 B2 8/2021 Tsai et al.
(Continued)

FOREIGN PATENT DOCUMENTS

CN 114298978 A * 4/2022
CN 114913164 A * 8/2022 ............. G06N 3/045
(Continued)

OTHER PUBLICATIONS

Citation for cited IDS NPL Item #5 showing Jun. 2022 Publication Date for prior art date used. (Year: 2022).*
(Continued)

*Primary Examiner* — Tyler W. Sullivan
(74) *Attorney, Agent, or Firm* — Haynes and Boone, LLP

(57) ABSTRACT

A method of compressing and detecting target features of a medical video is presented herein. In some embodiments, the method may include receiving an uncompressed medical video comprising at least one target feature, compressing the uncompressed medical video to generate a compressed medical video based on a predicted location of the at least one target feature using a first pretrained machine learning model, and detecting the location of the at least one target feature of the compressed medical video using a second pretrained machine learning model. In some embodiments, the first pretrained machine learning model and the second pretrained machine learning model may be trained in tandem using domain-specific medical videos.

17 Claims, 9 Drawing Sheets

(51) Int. Cl.

| | |
|---|---|
| *G06V 10/774* | (2022.01) |
| *G06V 10/82* | (2022.01) |
| *H04N 19/136* | (2014.01) |
| *H04N 19/147* | (2014.01) |
| *H04N 19/184* | (2014.01) |
| *H04N 19/436* | (2014.01) |
| *H04N 19/50* | (2014.01) |

(52) U.S. Cl.

CPC .............. *G06T 2207/20081* (2013.01); *G06T 2207/20084* (2013.01); *G06T 2207/30032* (2013.01)

(56) References Cited

U.S. PATENT DOCUMENTS

| | | | |
|---|---|---|---|
| 11,521,377 B1 * | 12/2022 | Wang ..................... | G06V 20/13 |
| 12,026,874 B2 * | 7/2024 | Protsenko ............. | G06T 7/0012 |
| 2021/0314629 A1 | 10/2021 | Tsai et al. | |
| 2022/0230311 A1 * | 7/2022 | Zhang ...................... | G06T 3/40 |
| 2024/0257497 A1 * | 8/2024 | Goldenberg ........... | G06V 10/82 |

FOREIGN PATENT DOCUMENTS

| | | | | |
|---|---|---|---|---|
| WO | WO-2020210734 A1 * | 10/2020 | .......... | G06V 20/698 |
| WO | WO-2021159774 A1 * | 8/2021 | ......... | G06F 18/2155 |

OTHER PUBLICATIONS

Espacenet provided translation of Lu (Year: 2022).*

STIC provided translation of Nuo (Year: 2022).*

STIC provided translation of Zhou (Year: 2021).*

"Learning Binary Residual Representations for Domain-Specific Video Streaming." University of California, The Thirty-Second AAAI Conference on Artificial Intelligence (AAAI-18). (8 pgs).

"Scale-space flow for end-to-end optimized video compression." (2020) IEEE/CVF Conference on Computer Vision and Pattern Recognition (CVPR) (10 pgs).

"Relevance-Based Compression of Cataract Surgery Videos Using Convolutional Neural Networks." MM '20, Oct. 12-16, 2020, Seattle, WA, USA. (10 pgs).

"Focal Loss for Dense Object Detection." arXiv:1708.02002v2 [cs.CV] Feb. 7, 2018 (10 pgs).

"VCT: A Video Compression Transformer." arXiv:2206.07307v1 [cs.CV] Jun. 15, 2022. (16 pgs).

* cited by examiner

100

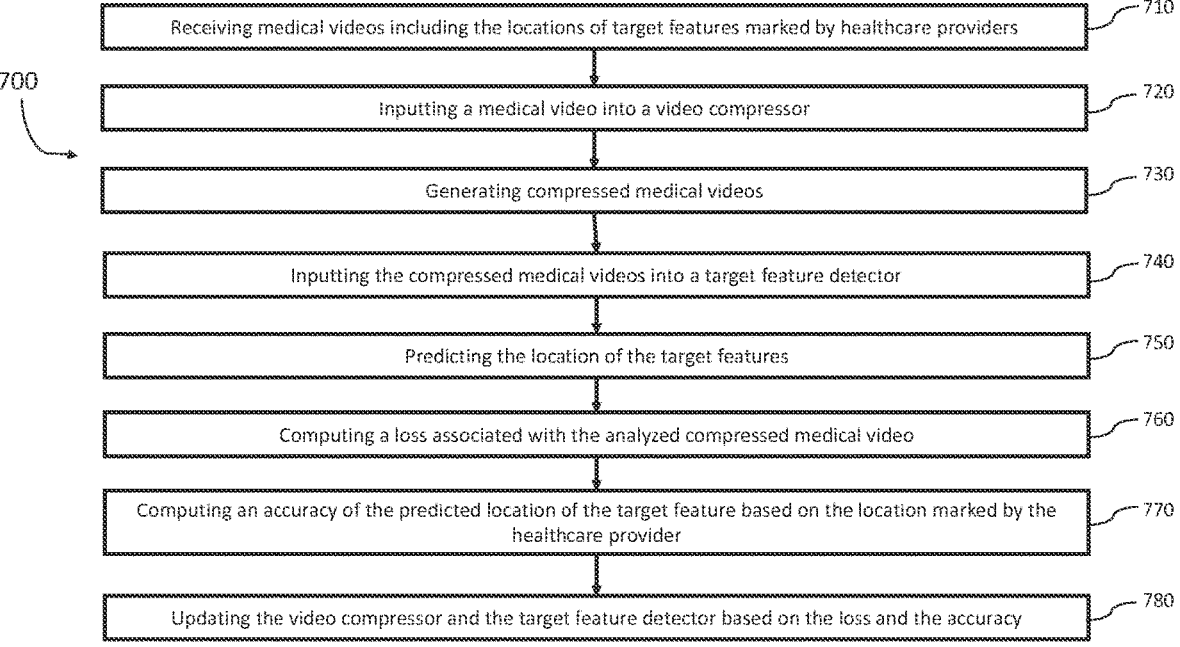

700

710 Receiving medical videos including the locations of target features marked by healthcare providers 720 Inputting a medical video into a video compressor 730 Generating compressed medical videos 740 Inputting the compressed medical videos into a target feature detector 750 Predicting the location of the target features 760 Computing a loss associated with the analyzed compressed medical video 770 Computing an accuracy of the predicted location of the target feature based on the location marked by the healthcare provider 780 Updating the video compressor and the target feature detector based on the loss and the accuracy

910 Receiving medical videos

920 Inputting the medical videos into a video compressor

930 Generating compressed medical videos

940 Inputting the compressed medical videos into a target feature detector

950 Detecting the target features in the compressed medical videos

960 Generating a compressed medical video identifying the location of the detected target features

COMBINED COMPRESSION AND FEATURE EXTRACTION MODELS FOR STORING AND ANALYZING MEDICAL VIDEOS

CROSS-REFERENCE TO RELATED APPLICATIONS

The present application claims the benefit of U.S. Provisional Application No. 63/410,522, filed on Sep. 27, 2022, which is incorporated by reference herein in its entirety.

TECHNICAL FIELD

The present disclosure relates generally to using deep learning models to compress medical videos and detect target features in the medical videos.

BACKGROUND

In recent years, data-driven algorithms have been developed that aim to detect diseases from medical videos (for example, detecting polyps in colonoscopy videos). In order to train and evaluate these algorithms, hospitals may need to store these videos and transfer them to a company that will use them to train the algorithms or, eventually, to diagnose diseases. A large number of videos is useful to train the algorithms and each individual video can be quite large. This makes transmitting and storing these medical videos difficult and very expensive. Therefore, being able to efficiently and effectively compress a large number of medical videos is important to bring down the cost of training and deploying diagnostic algorithms, and storing and transmitting medical videos in general.

SUMMARY

Methods of compressing and detecting target features of a medical video are presented herein. Some methods may include the steps of receiving an uncompressed medical video comprising at least one target feature; compressing the uncompressed medical video to generate a compressed medical video based on a predicted location of the at least one target feature using a first pretrained machine learning model; and detecting the location of the at least one target feature of the compressed medical video using a second pretrained machine learning model. In some contexts, target feature detection may also be referred to as feature extraction.

In some embodiments, the medical video may be obtained during a colonoscopy. Moreover, in some embodiments, the one or more target features of the at least one target feature may be a polyp.

In some embodiments, the first pretrained machine learning module may be a video compression transformer. In some embodiments, the second pretrained machine learning module may be a RetinaNet detector. In some embodiments, the first pre-trained machine learning model may be further configured to allocate a larger proportion of bits to the predicted location of the at least one target feature than to other parts of the medical video.

In some embodiments, the first pretrained machine learning model and the second pretrained machine learning model may be trained in tandem. In some embodiments, the second pretrained model may be designed to optimize detection of the at least one target feature. In some embodiments, the first pretrained model may be designed to optimize detection of the at least one target feature and to minimize the loss of the compressed medical video.

Systems for compressing and detecting target features of a medical video are described herein. In some embodiments, the systems may include an input interface configured to receive an uncompressed medical video, which may comprise at least one target feature, and a memory configured to store a plurality of processor-executable instructions. The memory may include a video compressor based on a first pretrained machine learning model, a target feature detector based on a second pretrained machine learning model, and a processor. The processor may be configured to execute the plurality of processor-executable instruction to perform operations including: receiving an uncompressed medical video comprising at least one target feature; compressing the uncompressed medical video to generate a compressed medical video based on a predicted location of the at least one target feature; and detecting the location of the at least one target feature of the compressed medical video.

In some embodiments, the first pretrained machine learning module may be a video compression transformer. the second pretrained machine learning module may be a RetinaNet detector. In some embodiments, the first pretrained machine learning model and the second pretrained machine learning model may be trained in tandem. In some embodiments, the second pretrained model may be designed to optimize detection of the at least one target feature. In some embodiments, the first pretrained model is designed to optimize detection of the at least one target feature and to minimize the loss of the compressed medical video.

In some embodiments a non-transitory processor-readable storage medium storing a plurality of processor-executable instructions for compressing and detecting target features of a medical video is described. The storage medium storing a plurality of processor-executable instructions for compressing and detecting target features of a medical video, the instructions being executed by a processor to perform operations comprising: In some embodiments, the instructions stored on the storage medium may be executed on a processor to perform operations including: receiving an uncompressed medical video comprising at least one target feature; compressing the uncompressed medical video to generate a compressed medical video based on a predicted location of the at least one target feature using a first pretrained machine learning model; and, detecting the location of the at least one target feature of the compressed medical video using a second pretrained machine learning model.

In some embodiments, the first pretrained machine learning module may be a video compression transformer. In some embodiments, the second pretrained machine learning module may be a RetinaNet detector. In some embodiments, the first pretrained machine learning model and the second pretrained machine learning model may be trained in tandem. In some embodiments, the first pretrained model may be designed to optimize detection of the at least one target feature and to minimize the loss of the compressed medical video and the second pretrained model may be designed to optimize detection of the at least one target feature.

BRIEF DESCRIPTION OF THE DRAWINGS

Illustrative embodiments of the present disclosure will be described with reference to the accompanying drawings, of which:

FIG. 7 is a simplified logic flow diagram illustrating an example method of training an example combined compressor and detector module, according to some embodiments described herein.

DETAILED DESCRIPTION

Figure 1:
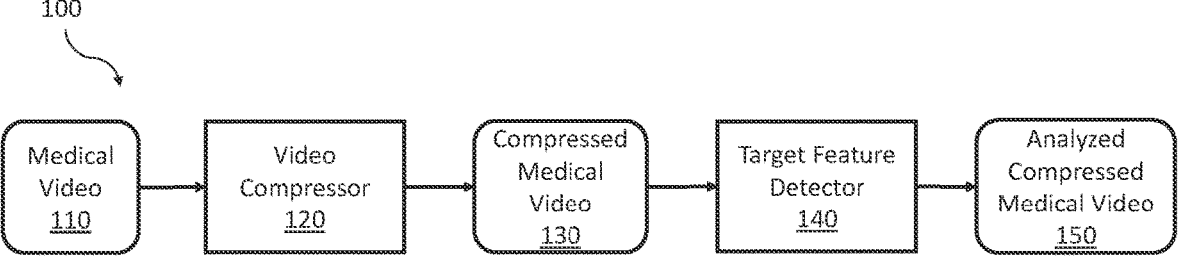
FIG. 1 is a simplified diagram illustrating an example embodiment of a process, according to one or more embodiments described herein.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Many scientists, physicians, programmers and others have been working on harnessing the power of artificial intelligence (AI) to quickly and accurately diagnose diseases. AI has been used in a variety of different diagnostic applications including, for example, identifying polyps in colonoscopy videos. Some of the most promising ways of detecting diseases from medical videos include using a machine learning (ML) and, in particular, neural networks (NN). By feeding an ML program hundreds or thousands of videos marked with the target feature, ML programs can develop methods, equations, and/or patterns for determining how to detect the target feature in future videos. For example, if a ML program is fed thousands of colonoscopy videos with the polyps marked by physicians, the ML program can learn what the polyp looks like and how to identify polyps in future colonoscopy videos.

However, storing these videos for training or for diagnosis may require a large amount of storage space. Moreover, if these videos need to be sent to the company developing the ML program, the large volume of videos may be difficult to transmit.

Compressing videos is a challenging task that requires balancing the size of the video with the quality of the video. In other words, there is a tradeoff between minimizing the bit rate and minimizing the distortion. When shrinking the size of the video file, a compressor often will often have to cut or combine certain parts of the file, resulting in a loss of quality. For diagnosing medical videos, the compression needs to result in a high enough quality for an algorithm to detect the target features in the video.

Data-driven image and video compression have surpassed standard codecs in the last several years. Learned compression algorithms improve upon traditional compression techniques in two ways that are both applicable to medical videos. First, neural network models learn complex nonlinear functions to maximize performance on the rate-distortion curve. These learned mappings often find better mappings than hand-crafted algorithms, in the general case. Second, learned compression algorithms are able to be finetuned for specific domains. For example, the machine learning (ML) training process can be used to tune an algorithm to maximize the rate-distortion curve specifically on medical videos.

Product applications of this technology are numerous. First, they decrease the cost of storing colonoscopy videos for algorithm training, medical records, and physician training. Second, they ensure that downstream models are not negatively affected by compression artifacts. Third, rapid compression can allow videos to be transmitted quickly, such as for report generation immediately after a procedure. Thus, improved ML algorithms are useful for intelligently compressing medical videos and diagnosing diseases from the videos.

As described herein, the present disclosure relates to an improved compressor that compresses medical videos by focusing on the target feature. Thus, the compressor can prioritize the quality of the most important parts of the video, improving subsequent detection of the target features. The compressor may be paired with the detector in a single program so that the compressor can be optimized for the accuracy of the subsequent detection.

These descriptions are provided for example purposes only and should not be considered to limit the scope of the invention described herein. Certain features may be added, removed, or modified without departing from the spirit of the claimed subject matter.

1. Overview

FIG. 1 is a simplified diagram illustrating an example embodiment of a process 100, according to one or more embodiments described herein. In the present embodiments, the process 100 describes aspects of using a video compressor 120 and target feature detector 130 incorporated in a computing device 200 (shown in FIG. 2) for compressing and detecting target features of a medical video (hereafter referred to as "the video") 110. In the present disclosure, the video 110 may be a colonoscopy video taken of a patient. However, it is contemplated that the video 110 could be any other type of medical video. In some instances, the video 110 may be captured from a video documenting a medical procedure to which a patient is subjected.

In the present embodiments, the video 110 is received as input data into the video compressor 120. The video compressor 120 is configured to compress the video 110. As described below, the video compressor 120 may include an ML model and in some cases may include a NN model. After the video 110 is compressed by the video compressor 120, the compressed video 130 is input into a target feature detector 140. The target feature detector 140 is configured to analyze the compressed video 130 and detect and target features that are shown in the video. For example, the video 110 may be a colonoscopy video and the target feature may be a polyp. The target feature detector 140 is configured to output the analyzed compressed video 150. In some embodiments, the target feature detector 140 may include an ML model and in some cases may include a NN model. In some embodiments, the analyzed compressed video 150 may identify the location of the target feature. The target feature detector 140 may output the location of the target features in any appropriate way. For example, the analyzed compressed video 150 may include a box, circle or other object surrounding the target features in the video. Moreover, the analyzed compressed video 150 may highlight the location of the target features in the video. In some embodiments, the output may be a list of the frames that include the target features and the area of those frames including the polyp. In some embodiments the output may include the number of target features detected.

In some embodiments, the video compressor 120 and the target feature detector 140 may be combined in a single module, described herein as a "combined compressor and detector module" or a "combined module". By combining the video compressor 120 and the target feature detector 140 into a single combined module, the combined module can be optimized for the size (e.g., bit-rate) and quality (e.g., distortion) of the compressed video 130 as well as the accuracy of detecting a target feature in the compressed video 130, as described in more detail below. This improves the module by allowing the video compressor 120 to prioritize maintaining the quality of the parts having target features over other parts of the video. Therefore, the video can be meaningfully compressed without sacrificing the diagnostic accuracy of the combined module.

Furthermore, as would have been understood based on the principles of this disclosure, the video compressor 120 and target feature detector 140 may be placed in series in either order, such that target feature detection may occur followed by video compression.

2. Computing Device

Figure 2:
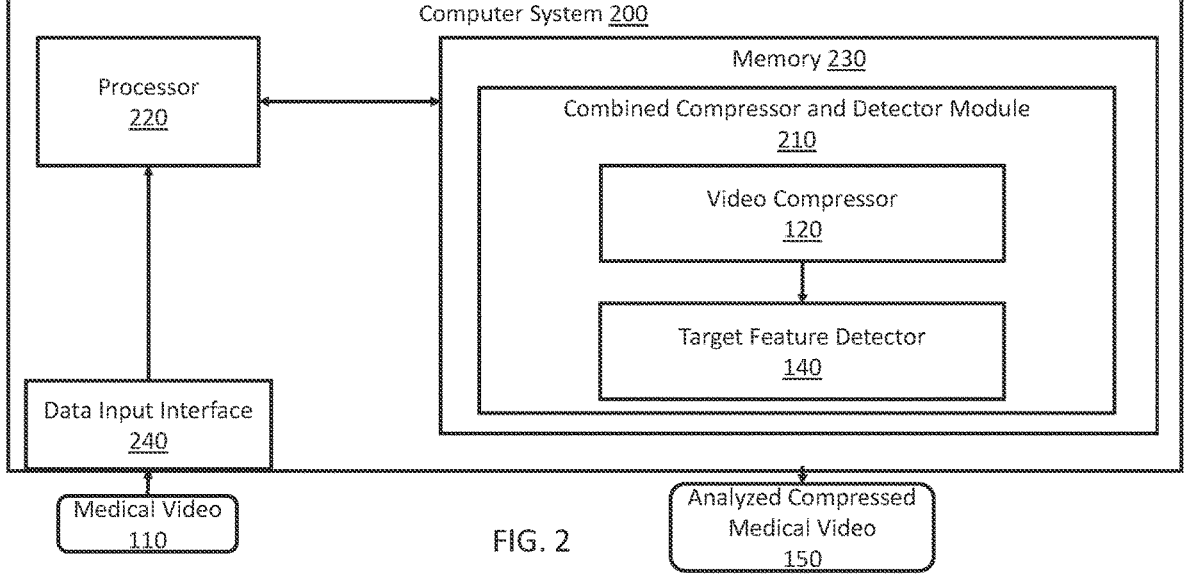
FIG. 2 is a simplified diagram of a computing device for implementing an example combined compressor and detector module, according to one or more embodiments described herein.

FIG. 2 is a schematic diagram illustrating a computer system 200 for implementing the combined compressor and detector module 210. The computer system 200 includes a processor 220 coupled to a memory 230. And although the computing device 200 is shown with only one processor 220, it is understood that processor 220 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in the computing device 200. The computing device 200 may be implemented as a stand-alone subsystem, as a board added to a computing device, and/or as a virtual machine.

The memory 230 may be used to store software executed by computing device 200 and/or one or more data structures used during operation of computing device 200. The memory 230 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor (e.g., the processor 220) or computer is adapted to read. In the present embodiments, for example, the memory 230 includes instructions suitable for training and/or using the combined module 210 described herein.

The processor 220 and/or the memory 230 may be arranged in any suitable physical arrangement. In some embodiments, the processor 220 and/or the memory 230 are implemented on the same board, in the same package (e.g., system-in-package), on the same chip (e.g., system-on-chip), and/or the like. In some embodiments, the processor 220 and/or the memory 230 include distributed, virtualized, and/or containerized computing resources. Consistent with such embodiments, the processor 220 and/or the memory 230 may be located in one or more data centers and/or cloud computing facilities.

In some examples, the memory 230 may include non-transitory, tangible, machine readable media that includes executable code that when run by one or more processors (e.g., the processor 220) may cause the one or more processors to perform the methods described in further detail herein. For example, as shown, the memory 230 includes instructions for an online adaptation module that may be used to implement and/or emulate the systems and models, and/or to implement any of the methods described further herein. In some examples, the combined module 210 may receive an input that includes the medical video 110 via a data input interface 240. The data input interface 240 can then send the medical video 110 to the processor 220. The combined module 210 may then generate one or more output data, such as the analyzed compressed medical video 150, in response to the input data.

In some embodiments, the combined module 210 includes at least the video compressor 120 and the target feature detector 140, as discussed in more detail below. In some examples, the combined module 210 and its components may be implemented using hardware, software, and/or a combination of hardware and software.

Some examples of computing devices, such as the computing device 200, may include non-transitory, tangible, machine-readable media that include executable code that when run by one or more processors (e.g., the processor 220) may cause the one or more processors to perform the processes of methods 400 described below. Some common forms of machine-readable media are discussed in detail above.

3. The Combined Compressor and Detector Module

The combined compressor and detector module 210 includes the video compressor 120 and the target feature detector 140, which are described individually below.

3.1 The Video Compressor

The video compressor 120 is configured to compress the medical video 110. The video compressor 120 may include any available video compression techniques. For example, the video compressor 120 may be an ML or NN based video compressor. In some embodiments, the NN based video compressor may be a video compressor transformer. In particular embodiments, the video compressor transformer may be a transformer-based temporal entropy model, such as the transformer-based temporal entropy model described in Mentzer et al., *VCT: A Video Compression Transformer*, arXiv:2206.07307 (Jun. 15, 2022), the entirety of which is incorporated herein by reference.

Figure 3:
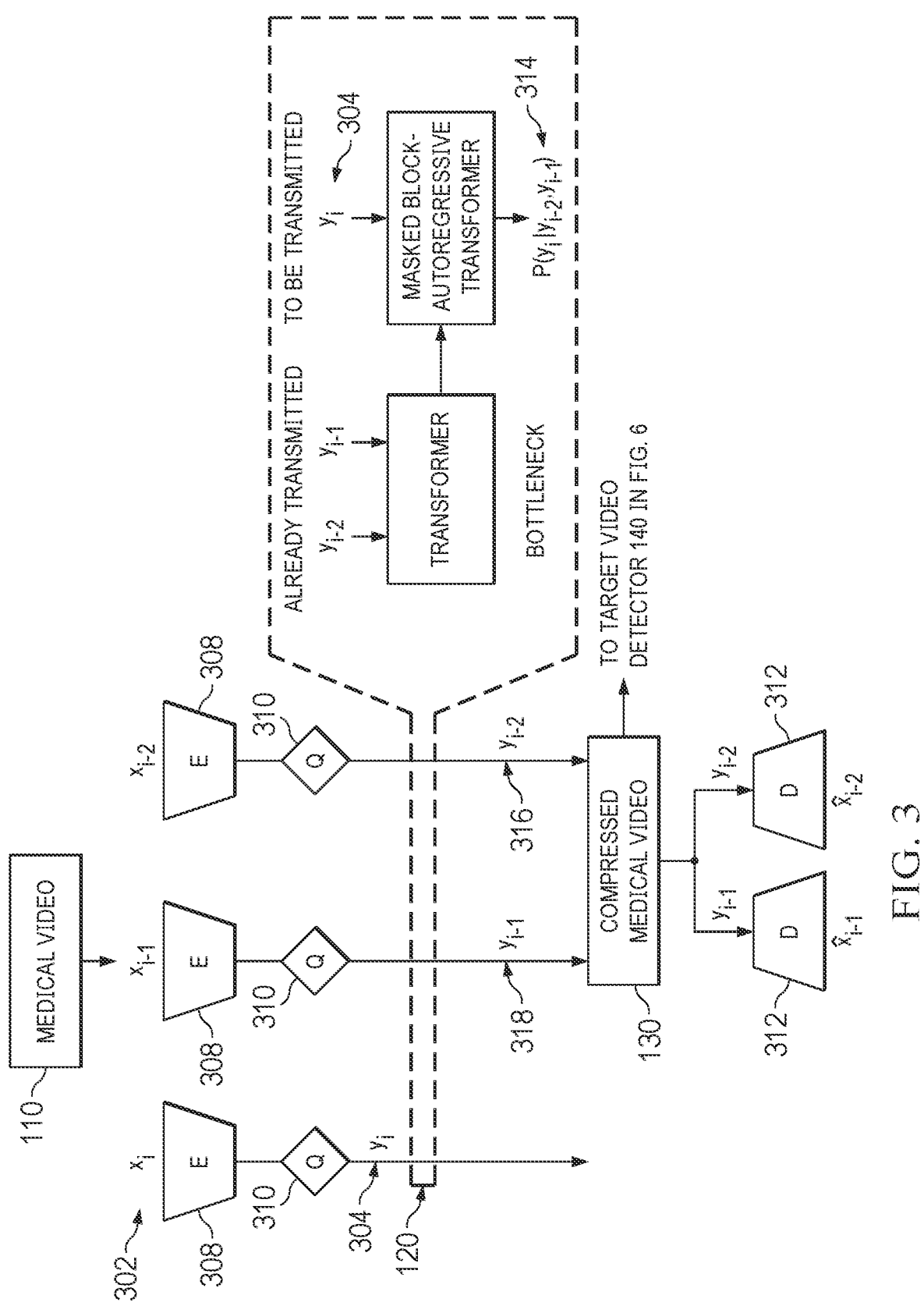
FIG. 3 is a simplified diagram illustrating an example video compressor architecture, according to one or more embodiments described herein.

FIG. 3 illustrates a simplified diagram of the video compressor 120, according to some aspects of the present disclosure. FIG. 3 provides a high-level overview of a transformer-based temporal entropy model that may be used in some embodiments.

The medical video 110 may include some number of frames, each frame being denoted by "x". Each frame x may be independently and lossily mapped into quantized representations y. From y a reconstruction z may be recovered. To store $y_i$ 304 with few bits, transformers may be used to model temporal dependencies and to predict a distribution for $y_i$ given previously transmitted representations. P may losslessly compress the quantized $y_i$ using entropy coding ("EC"). The better the transformer predicts P, the fewer bits are required to store $y_i$.

The video compressor 120 may use transformers to compress videos in two steps. First, using lossy transform coding to map frames $x_i$ 302 of the medical video 110 from image space to quantized representations $y_i$ 304, independently for each frame. From $y_i$ 304 a reconstruction $\hat{x}_i$ may be recovered. Second, a transformer may leverage temporal redundancies to model the distributions of the representations. The predicted distributions may losslessly compress the quantized $y_i$ 304 using EC. In this way, the transformer-based temporal entropy model may avoid complex state transitions or warping operations by letting the transformer learn to leverage arbitrary relationships between frames. Moreover, in some embodiments, there may be no temporal error propagation by construction since the reconstruction $\hat{x}_i$ does not depend on previous reconstructions.

Each frame $x_i$ 302 may be encoded into a quantized representation $y_i = E(x_i)$ using a convolutional neural network (CNN) based image encoder ("E") 308 followed by quantization 310 to an integer grid. The encoder 308 downscales spatially and increases the channel dimension, resulting in $y_i$ being a (H, W, $d_C$)-dimensional feature map, where H and W are 16× smaller than the input image resolution (H represents height, W represents width, and $d_C$ represents the number of convolutional filters in the convolutional layer). Thus, all y frames combined will result in the compressed medical video 130.

In some embodiments, the compressed medical video 130 may be decompressed using a decoder ("D") 312. From $y_i$ 304 in the compressed medical video 130, a reconstruction $\hat{x}_i$ can be recovered using the decoder 312. The encoder 308 and decoder 312 may be trained using standard neural image compression techniques to be lossy transforms reaching nearly any desired distortion d $(x_i, \hat{x}_i)$ by varying how large the range of each element in $y_i$ is.

Given a probability mass function (PMF) P estimating the true distribution Q of symbols in $y_i$ 304, entropy coding ("EC") can be used to transmit $y_i$ 304 with $H \cdot W \cdot d_C \cdot E_{y \sim Q(yi)}$ $[-\log_2 P(y)]$ bits. By using EC, more frequently occurring values can be encoded with fewer bits, thus improving the efficiency. The expectation term representing the average bit count may correspond to the cross-entropy of Q with respect to P. P may be used for lossless EC, without sampling from the model to transmit data. In some embodiments, the model may be able to exploit the temporal redundancy across frames, and the spatial consistency within frames.

To compress a medical video 110 of F number of frames, $x_1, \ldots, x_F$, each frame x may be encoded via encoder 308, then quantized via quantizer 310 to generate quantized representations $y_1, \ldots, y_F$. Assuming $y_1, \ldots, y_{i-1}$ have already been compressed or transmitted, to transmit $y_i$ 304, we use the transformer to generate a prediction distribution $P(y_i|y_{i-2},y_{i-1})$ 314. Using this distribution, $y_i$ 304 may be entropy encoded to create a compressed, binary representation that can be stored or transmitted.

To compress the full video, this procedure may be applied iteratively for each frame in the medical video 110, letting the transformer predict $P(y_j|y_{j-2},y_{j-1})$ for $j \in \{1, \ldots, F\}$, padding with zeros when predicting distributions for $y_1$ and $y_2$.

When the compressed medical video 130 is decompressed, the same procedure may be used to recover all $y_j$, i.e., it iteratively calculates $P(y_j|y_{j-2},y_{j-1})$ to entropy decode each $y_j$. After obtaining each representation, $y_1,y_2, \ldots, y_F$, the reconstructions may be generated.

Figure 4:
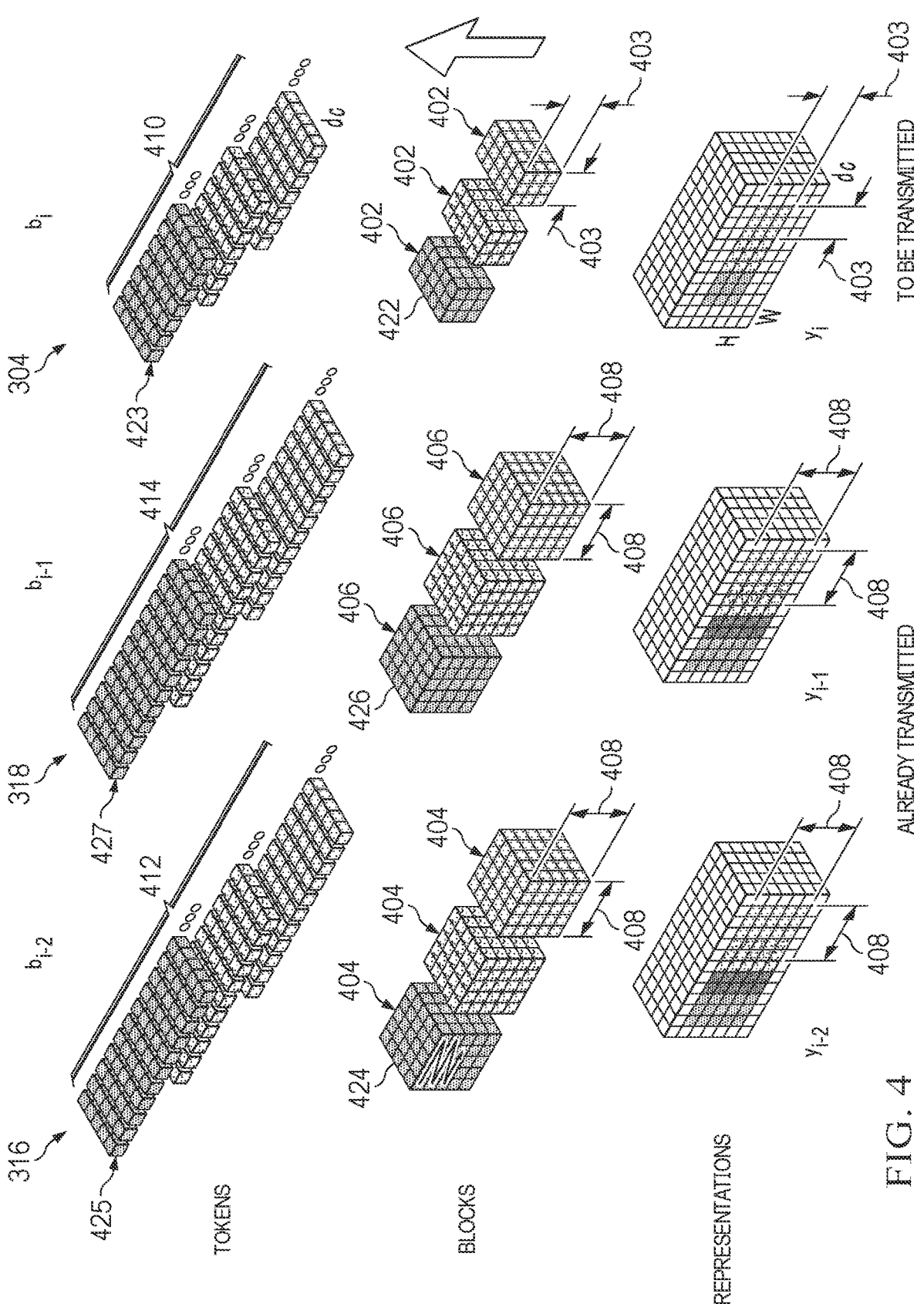
FIG. 4 is a simplified diagram illustrating a part of an example video compressor architecture, according to one or more embodiments described herein.

Compressing the current representation $y_i$ 304, the representation may be split spatially into non-overlapping blocks 402 with size wc×wc 403. FIG. 4 is a diagrammatic representation of how the current representation $y_i$ 304 is processed.

Previous representations $y_{i-2}$ 316 can become non-overlapping blocks 404 and $y_{i-1}$ 318 can become non-overlapping blocks 406. The non-overlapping blocks 404, 406 may be sized wp×wp 408 (where wp>wc) to provide both temporal and spatial context for predicting P (yi|yi−2,yi−1) 314. Intuitively, the larger spatial extent provides useful context to predict the distribution of the current block. All blocks may span a relatively large spatial region in image space due to the downscaling convolutional encoder 208. Each block 402, 404, 406 can then be flattened spatially to obtain tokens 410, 412, 414 for the transformers. The transformers then run independently on corresponding blocks 402, 404, 406 and tokens 410, 412, 414. In other words, each block and its corresponding token get processed together, trading reduced spatial context for parallel execution. In some embodiments, the processing may focus on a single block. For example, block 422 and corresponding token 423 of $y_i$ 304, block 424 and corresponding token 425 of $y_{i-2}$ and block 426 and corresponding token 427 of $y_{i-1}$.

Figure 5:
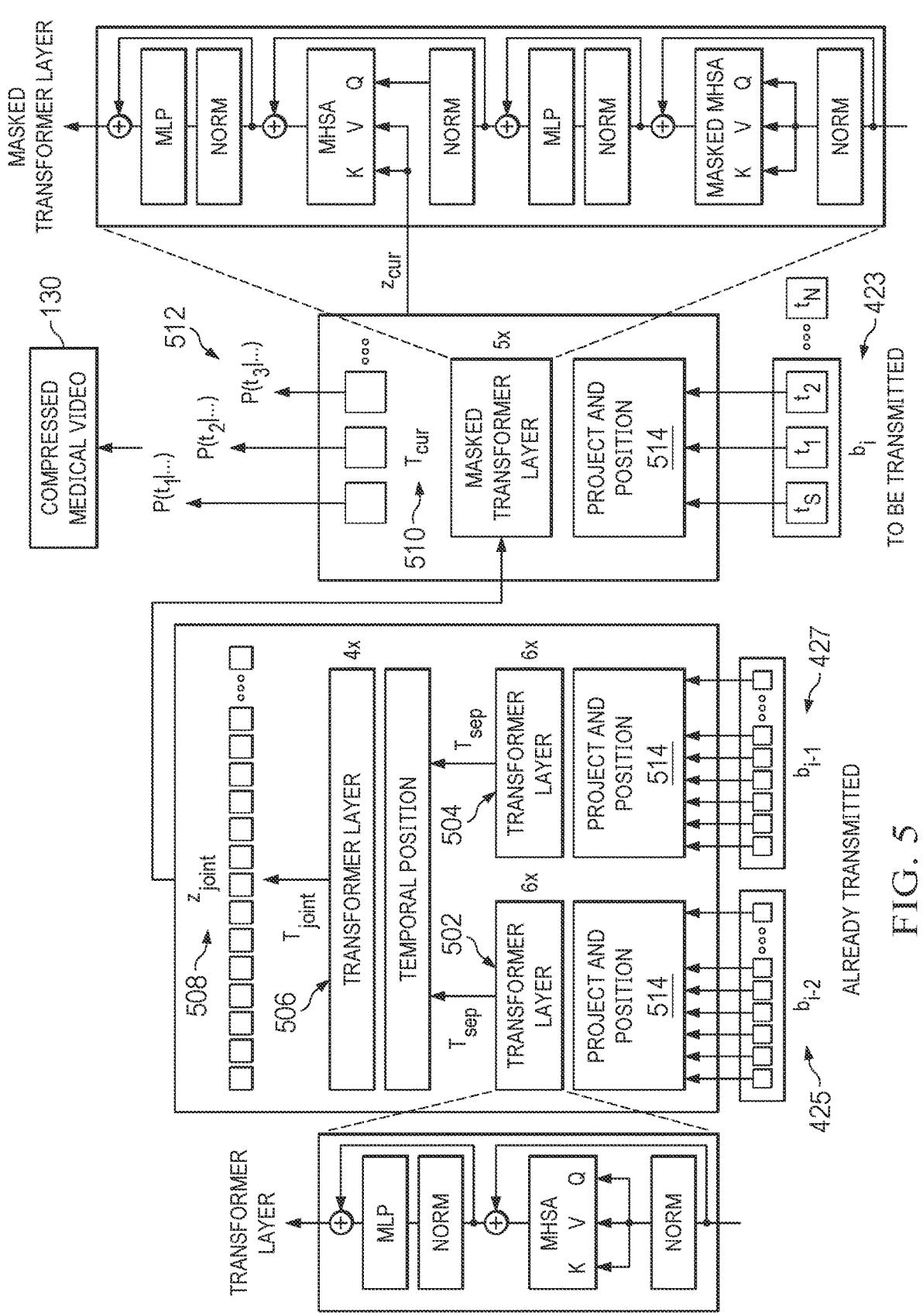
FIG. 5 is a simplified diagram illustrating a part of an example video compressor architecture, according to one or more embodiments described herein.

FIG. 5 illustrates a diagrammatic representation of how the blocks 402, 404, 406 may be used to form a prediction for $y_i$ 304. Two transformers may be used to extract information from the previous blocks 404, 406. A first transformer $T_{sep}$ 502, 504 operates separately on the tokens 425, 427 of previous blocks 404, 406, respectively. The outputs of the first transformers 502, 504 are then concatenated. The concatenated outputs are then input into the second transformer $T_{joint}$ 506 on the result to mix information across time. The output from the second transformer 506 is $z_{joint}$ 508, which is 2×2 p features. $z_{joint}$ 508 contains the information that the model learned from processing the past frames.

The second part is the masked transformer $T_{cur}$ 510, which predicts PMFs for each token 423, 425, 427 using auto-regression within the block, which may create a powerful model by conditioning $T_{cur}$ 510 on $z_{joint}$ 508 as well as already transmitted tokens 425, 427 within the block 424, 426.

A start token $t_S$ may be chosen. After $z_{joint}$ 508 is obtained, $[t_S]$ may be input to $T_{cur}$ 510 to obtain $P(t_1|t_S;z_{joint})$ 512, and use entropy coding to store the $d_C$ symbols in token $t_1$ into a bitstream using $P(t_1|t_S;z_{joint})$ 512. For $t_2$, $[t_S,t_1]$ may be fed into $T_{cur}$ 510 to obtain $P(t_1|t_S;z_{joint})$ 512 and $t_2$ may be stored in the bitstream, and so on. The resulting bitstream may be used during decompression through the same process. In FIG. 5, this process is illustrated for $t_3$.

In some embodiments, this procedure is used in parallel over all blocks 402, 404, 406. In some embodiments, to ensure causality of $T_{cur}$ 510 during training, the self-attention blocks may be masked. The process may assume that the blocks 402 in $y_i$ 304 are independent. Moreover, in some embodiments, it may be assumed that the symbols within each token 410 are conditionally independent given previous tokens 412, 414. In other words, $T_{cur}$ 510 predicts the $d_C$ distributions required for a token at once. In other embodiments, a joint distribution may be predicted over all possible $|S|d_C$ realizations, channel-autoregression may be used, or vector quantization on tokens may be used.

The transformers 502, 504, 506, 510 may be based on standard architectures. In some embodiments, the $d_C$-dimensional tokens may be projected to a $d_T$-dimensional space using a single fully connected layer 514 and adding a learned positional embedding. In some embodiments, both $T_{sep}$ 502, 504 and $T_{joint}$ 506 are stacks of multi-head self-attention (MHSA) layers. In some embodiments, $T_{cur}$ 510 uses masked "conditional" transformer layers. These may alternate between masked MHSA layers and MHSA layers that use z joint 508 as keys and values, as shown in FIG. 5. In a particular embodiment, 6 transformer layers for $T_{sep}$ 502, 504 are used, 4 transformer layers for $T_{joint}$ 506, and 5 masked transformer layers for $T_{cur}$ 510. 16 attention heads may be used in each transformer 502, 504, 506, 508. In some embodiments, a separate temporal positional embedding may be added to the input of $T_{joint}$ 506.

The encoder 308 and decoder 312 may be any standard encoder or decoder used for video compression. In some embodiments, for the encoder 308, 4 strided convolutional layers may be used, which may downscale by a factor 16× in total. In some embodiments, for the decoder 312, transposed convolutions may be used and additionally add residual blocks at the low resolutions may be used. In some embodiments, $d_{ED}$=192 filters may be used for all layers.

In some embodiments, the powerful representation that the transformer learns may be further leveraged. In some embodiments, a latent residual predictor ("LRP") may be used. In some embodiments, the final features $z_{cur}$ from $T_{cur}$ have the same spatial dimensions as $y_i$ 304 and contain everything the transformer knows about the current and previous representations. These may be helpful to reconstruct $\hat{x}_i$. We thus use $z_{cur}$ by feeding $y_i = y_i + f_{LRP}(z_{cur})$ to the decoder 312, where $f_{LRP}$ may consist of a 1×1 convolution mapping from $d_T$ to $d_{ED}$ followed by a residual block. This may prevent temporal error propagation.

3.2 The Target Feature Detector

Once the medical video 110 has been compressed, the compressed medical video 130 may be input into the target feature detector 140. The target feature detector 140 may use any appropriate detection techniques. For example, the target feature detector 140 may be an ML or NN based object detector. In some embodiments, the NN based target feature detector may be a two stage, proposal-driven mechanism such as a region-based convolutional neural network (R-CNN) framework. In some embodiments, the target feature detector 140 may use a RetinaNet architecture, as described in, for example, Lin et al., *Focal Loss for Dense Object Detection*, arXiv:1708.02002 (Feb. 7, 2018) or in U.S. Patent Publication No. 2021/0225511, the entirety of which are incorporated herein by reference.

Figure 6:
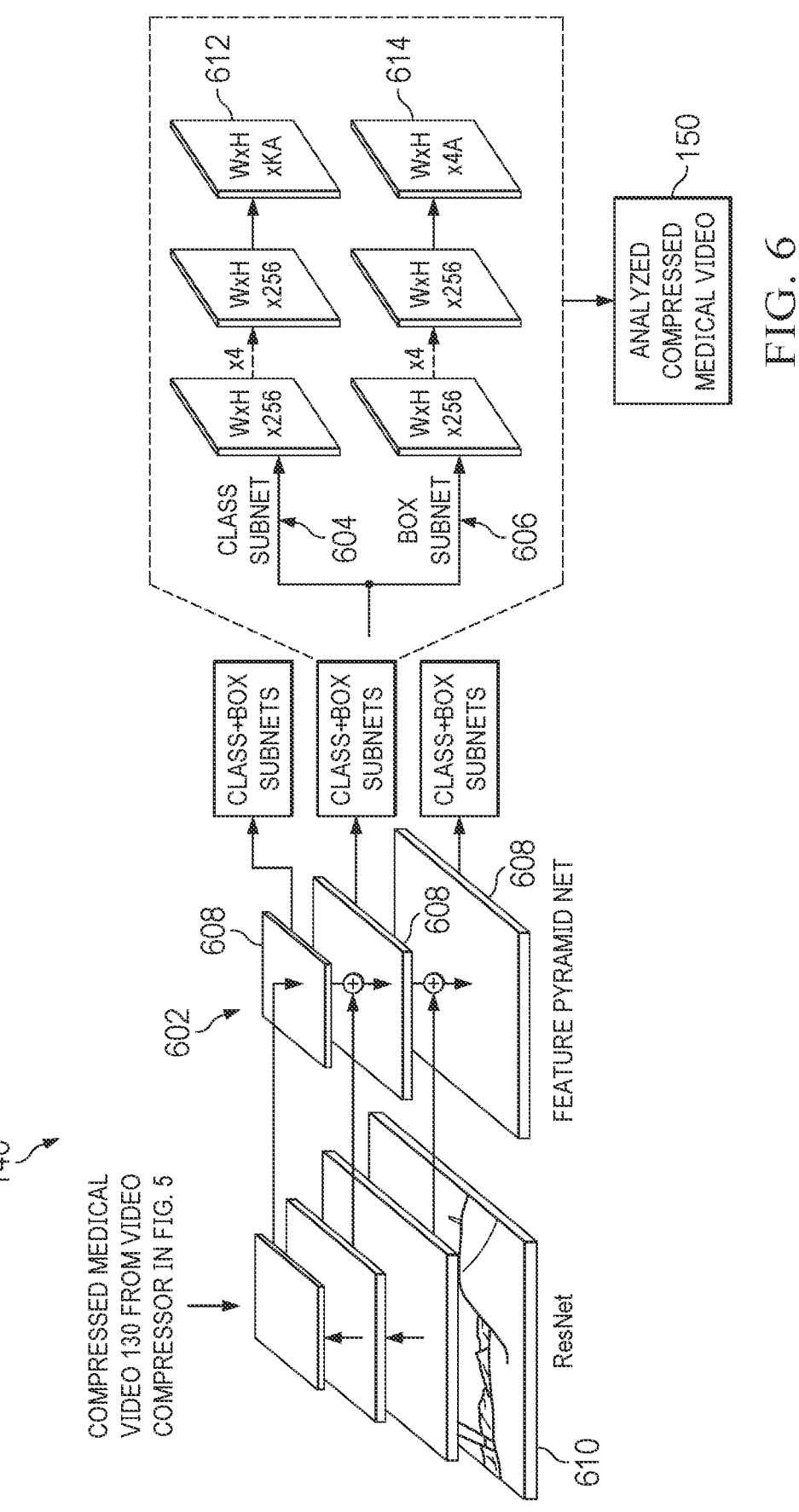
FIG. 6 is a simplified diagram illustrating an example target feature detector architecture, according to one or more embodiments described herein.

FIG. 6 illustrates a diagram of a RetinaNet architecture that may be used for the target feature detector 140. RetinaNet is a single, unified network composed of a backbone network 602 and two task-specific subnetworks 604, 606. The backbone 602 computes a convolutional feature map

608 over an entire input image 610. The backbone 602 may be an off-the-shelf convolutional network. The first subnet 604 performs convolutional object classification on the backbone's output. The second subnet 606 performs convolutional bounding box regression. The two subnetworks 604, 606 feature a simple design that may be used for one-stage, dense detection.

In some embodiments, a Feature Pyramid Network (FPN) may be used as the backbone network 602 for RetinaNet. FPN may augment a standard convolutional network with a top-down pathway and lateral connections so the network efficiently constructs a rich, multi-scale feature pyramid 608 from a single resolution input image 610. Each level of the pyramid 608 can be used for detecting objects at a different scale. FPN may be built on top of the ResNet architecture. A pyramid with levels P3 through P7 may be used, where l indicates pyramid level (Pl has resolution 2l lower than the input). In some embodiments, all pyramid levels have C=256 channels.

In some embodiments, translation-invariant anchor boxes may be used. In some embodiments, the anchors have areas of 322 to 5122 on pyramid levels P3 to P7, respectively. At each pyramid level anchors at three aspect ratios {1:2, 1:1, 2:1} may be used. For denser scale coverage, at each level anchors of sizes {$2^0$, $2^{1/3}$, $2^{2/3}$} of the original set of 3 aspect ratio anchors may be used. In total there may be A=9 anchors per level and across levels they may cover the scale range 32813 pixels with respect to the network's input image. Each anchor may be assigned a length K one-hot vector of classification targets, where K is the number of object classes, and a 4-vector of box regression targets. Anchors may be assigned to ground-truth object boxes using an intersection-over-union (IoU) threshold of 0.5 and to background if their IoU is in [0, 0.4). As each anchor is assigned to at most one object box, in some in some embodiments a corresponding entry in its length K label vector may be assigned to 1 and all other entries may be assigned to 0. If an anchor is unassigned, which may happen with overlap in [0.4, 0.5), the anchor may be ignored during training. Box regression targets may be computed as the offset between each anchor and its assigned object box. If there is no assignment, the anchor may be omitted.

In some embodiments, the classification subnet 604 predicts the probability of object presence at each spatial position for each of the A anchors and K object classes. The classification subnet 604 may be a small FCN attached to each FPN level. Parameters of this subnet can be shared across all pyramid levels. Taking an input feature map with C channels from a given pyramid level, the subnet 604 applies four 3×3 cony layers, each with C filters and each followed by ReLU activations, followed by a 3×3 cony layer with KA filters. Then, sigmoid activations can be attached to output the KA binary predictions 612 per spatial location. In some embodiments, C=256 and A=9 may be used. In some embodiments, the subnet 604 may be deep, may use only 3×3 convs, and may not share parameters with the box regression subnet 606.

In parallel with the object classification subnet 604, another small FCN may be attached to each pyramid level for the purpose of regressing the offset from each anchor box to a nearby ground-truth object, if one exists. In some embodiments, the design of the box regression subnet 606 is identical to the classification subnet 604 except that it terminates in 4A linear outputs 614 per spatial location rather than KA outputs 612 per spatial location. For each of the A anchors per spatial location, these 4 outputs 314 may predict the relative offset between the anchor and the ground truth box. In some embodiments, a class-agnostic bounding box regressor may be used. The class-agnostic bounding box regressor may use fewer parameters. In some embodiments, the object classification subnet 604 and the box regression subnet 606 may share a common structure, but may use different parameters.

4. Optimization and Training

During training, the video compressor 120 and the target feature detector 140 are optimized in tandem. When the video compressor 120 and the target feature detector 140 are optimized together, the video compressor 120 can be optimized for both improved compression metrics and the accuracy of detecting the target feature. In this way, the video compressor 120 may learn to compress the medical video 110 in a way that will allow the target feature detector 140 to accurately detect the target features. A novel feature of this disclosure is that training is performed using domain-specific videos, such as videos of a specific medical procedure (e.g., colonoscopy videos).

4.1 Optimizing Compression Metrics

The video compressor 120 may be optimized according to any appropriate compression metrics.

In embodiments where a video compression transformer, such as the transformer-based temporal entropy model described above, is used, the optimization and training may be split into three stages.

In Stage I, the per-frame encoder E 308 and decoder D 312 may be trained by minimizing the rate-distortion trade-off. Where U denote a uniform distribution in [−0.5,0.5], the following may be minimized:

$$\mathcal{L}_1 = \mathbb{E}_{x \sim p_X, u \sim \mathcal{U}} \left[ \underbrace{-\log p(\tilde{y}+u)}_{bit-rate\ r} + \lambda \underbrace{MSE(x, \hat{x})}_{distortion\ d} \right], \quad (1)$$

$$\tilde{y} = E(x), \hat{x} = D(round_{STE}(\tilde{y})),$$

using $\tilde{y}$ to refer to the unquantized representation, and $x \sim p_X$ are frames drawn from the training set. In some aspects, it may be desirable to minimize the reconstruction error under while still effectively quantizing the encoder output. Thus, $\lambda$ may control the tradeoff between minimizing the reconstruction error and effectively quantizing the encoder output. For Stage I, the meanscale hyperprior approach may be used to estimate p, the de facto standard in neural image compression, which may be discarded for later stages. To enable end-to-end training, i.i.d. uniform noise u may be added to $\tilde{y}$ when calculating r. Moreover, straight-through estimation (STE) for gradients may be used when rounding $\tilde{y}$ to feed it to D.

For Stage II of the training stages, the video compression transformer may be trained to obtain p, and only minimize rate:

$$\mathcal{L}_{II} = \mathbb{E}_{(x_1,x_2,x_3) \sim pX_{1:3}, u \sim \mathcal{U}} [-\log p(\tilde{y}_3+u|y_1,y_2)] \ \tilde{y}_i = E(x), y_i = round(y_i), \quad (2)$$

where $(x_1, x_2, x_3) \sim pX_{1:3}$ are triplets of adjacent video frames. It can be assumed that each of the $d_C$ unquantized elements in each token follow a Gaussian distribution, $p \sim N$, and the transformer may predict $d_C$ means and $d_C$ scales per token.

In Stage III of the training stages, everything may be finetuned jointly by adding the distortion loss to the Stage II result. To obtain a discrete PMF P for the quantized symbols (for entropy coding), standard practice may be followed, convolving p with a unit-width box and evaluating it at discrete points:

$$P(y) = \int_{u \in \mathcal{U}} p(y+u), y \in Z \quad (3)$$

To train, random spatio-temporal crops of (B,NF,256,256, 3) pixels may be used, where B is the batch size, and NF is the number of frames. The linearly decaying learning rate (LR) schedule with warmup may be used. In some embodiments, Stage I may be trained using $\lambda=0.01$. To navigate the rate-distortion trade-off and obtain results for multiple rates, 9 models may be finetuned in Stage III, using $\lambda=0.01 \cdot 2^i$, i∈{−3, . . . ,5}.

4.2 Optimizing Accuracy of Detecting Target Features

In addition to using the above methods to optimize compression, both the video compressor 120 and the target feature detector 140 may be trained to optimize detecting target features. This joint optimization may simultaneously take into account the quality of the video after compression and decompression, as well as reducing both the probability of mislabeling a frame as having a feature when it does not (also referred to as false positive) and reducing the probability of mislabeling a frame as not having a feature when it does (also referred to has false negative).

For the RetinaNet architecture described above, focal loss may be used as the loss on the output of the classification subnet 604. In some embodiments, a focal loss of $\gamma=2$ may be used or any appropriate focal loss may be used, including $\gamma \in [0.5,5]$. This focal loss may be applied to all anchors. However, in other embodiments heuristic sampling (RPN) or hard example mining (OHEM, SSD) may be used to select a small set of anchors (e.g., 256) for each minibatch for applying the focal loss. The total focal loss of an image may be computed as the sum of the focal loss over all anchors, normalized by the number of anchors assigned to a ground-truth box. Normalization may be performed by the number of assigned anchors or by total anchors. In some embodiments, $\alpha$ and the focal loss may be chosen together. In some embodiments, $\alpha$ can be decreased slightly as $\gamma$ is increased such as, for example, $\gamma=2$, $\alpha=0.25$.

In some embodiments, ResNet-50-FPN or ResNet-101-FPN backbones 602 may be used. The base ResNet-50 and ResNet-101 models may be pre-trained on ImageNet1k. All new cony layers except the final one in the RetinaNet subnets 604, 606 may be initialized with bias b=0 and a Gaussian weight fill with $\sigma=0.01$. For the final cony layer of the classification subnet 604, the bias initialization may be set to $b=-\log((1-\pi)/\pi)$, where $\pi$ specifies that at the start of training every anchor should be labeled as foreground with confidence of $\sim\pi$. In some embodiments, $\pi=0.01$. This initialization may prevent the large number of background anchors from generating a large, destabilizing loss value in the first iteration of training.

In some embodiments, RetinaNet may be trained with stochastic gradient descent (SGD). In some embodiments, synchronized SGD may be used over 8 graphics processing units (GPUs) with a total of 16 images per minibatch (2 images per GPU). In some embodiments, all models may be trained for 90 k iterations with an initial learning rate of 0.01, which is then divided by 10 at 60 k and again at 80 k iterations. In some embodiments, horizontal image flipping may be used for data augmentation. In some embodiments, a weight decay of 0.0001 and a momentum of 0.9 can be used. The training loss may be the sum of the focal loss and the standard smooth $L_1$ loss used for box regression.

4.3 Optimizing and Training the Combined Compressor and Detector Module

The training and optimization described above for each individual component may be used in training the overall program.

Figure 8:
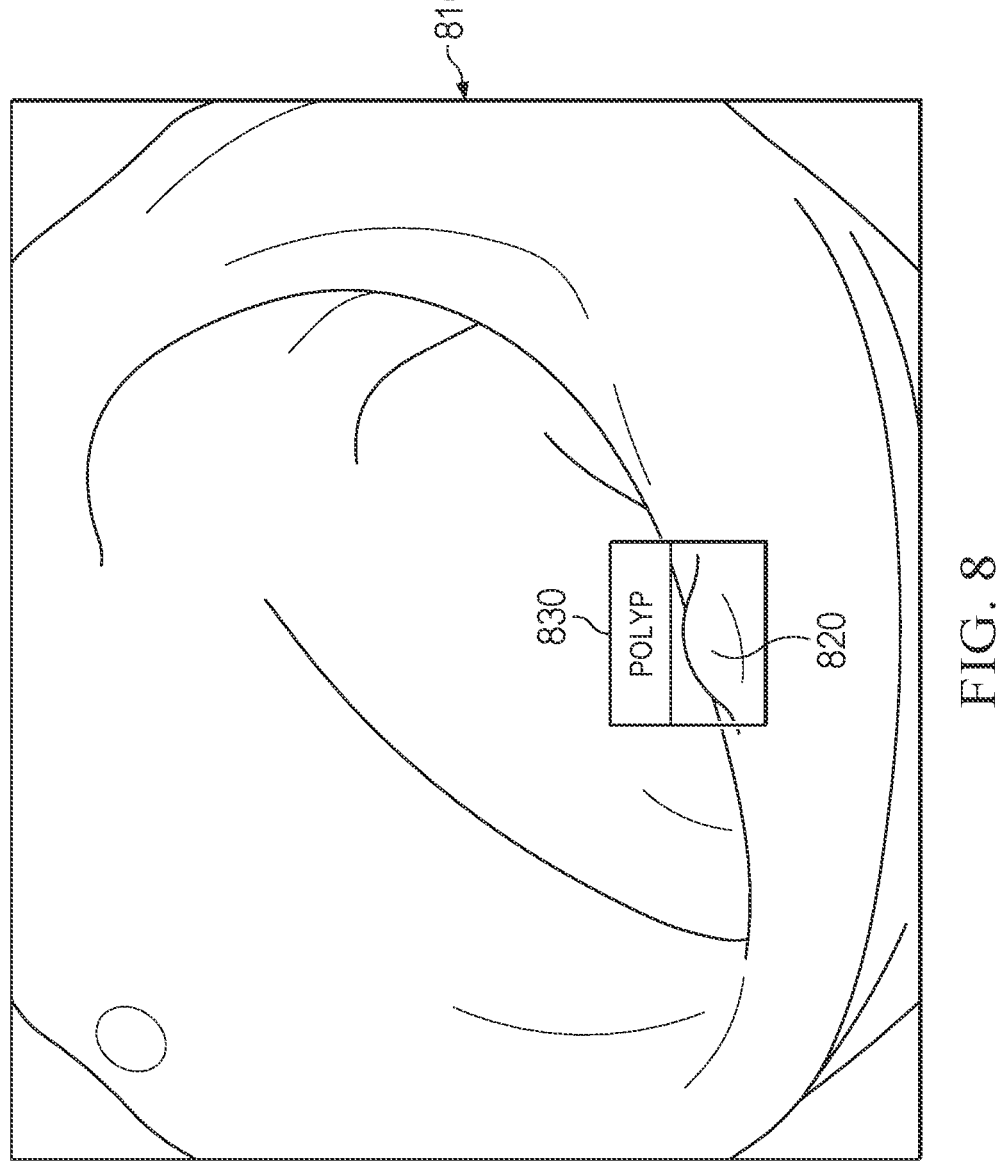
FIG. 8 is an example video frame marked by a healthcare provider, according to some embodiments described herein.

The method 700 of training the combined compressor and detector module 210 according to some aspects of the present disclosure is illustrated in the flow diagram of FIG. 7. The method 700 may include the step 710 of receiving marked medical videos 110 including the locations of target features marked by healthcare providers. The training data for the combined module 210 may include a medical video 110 in which a healthcare provider has marked the location of the target features. FIG. 8 illustrates an example of what the training data may look like. FIG. 8 shows a frame 810 of a medical video 110, in this case, a colonoscopy video. A healthcare provider has marked the location of a target feature 820, in this case, a polyp, with a box 830 around the target feature. Some of the medical videos 110 may contain no marked features because they do not include any of the target features (e.g., in the case of a colonoscopy video of a colon that is polyp-free).

The method 700 of training the combined module 210 may also include the step 720 of inputting a medical video into the video compressor 120. Any appropriate number of medical videos 110 may be used for training. For example, dozens, thousands, or millions of videos may be used during training. Thus, any appropriate number of medical videos 110 may be input into the video compressor 120.

The method 700 may further include the step 730 of generating a compressed medical video 130. In this step, the video compressor 120 may compress the medical video 110. As described in more detail above, any appropriate type of video compressor may be used. For example, a video compression transformer or, in particular, a transformer-based temporal entropy model may be used to compress the medical video 110.

The method 700 may further include the step 740 of inputting the compressed medical video into a target feature detector 140. Once the medical video 110 has been compressed, the compressed medical video 130 output from the video compressor 120 may be input into the target feature detector 140. As described in more detail above, any appropriate type of target feature detector may be used. For example, the target feature detector 140 may be an object detector and, in particular, may be a RetinaNet detector.

The method 700 may also include the step 750 of predicting the presence and location of the target features. The target feature detector 140 may detect the presence and location of the target features in the compressed medical videos 130. As described in more detail above, the analyzed compressed medical video 150 output of the target feature detector 140 may be in any appropriate form. For example, in some embodiments, the target feature detector 140 may mark a box around the location it predicted as showing a target feature, similar to the box the healthcare provider marked around the target feature as shown in FIG. 8.

The method 700 may further include the step 760 of computing a loss associated with the analyzed compressed medical video 150. As described above, the analyzed compressed medical video 150 may be compared to the medical video 110. For example, the loss may be calculated according to Eqns. (1), (2), and (3) as described above.

The method 700 may also include the step 770 of computing an accuracy of the predicted location of the target feature based on the location of the marked by the healthcare provider. The location marked by the healthcare professional may be compared to the location predicted by the target feature detector 140. The accuracy of the prediction may be calculated using SGD, as described in more detail above. The accuracy of the prediction may also take into account false positives/false alarms, which reflect indication of a target feature when none exists, and also false negatives, which reflect absence of a target feature when one exists.

The method 700 may also include the step 780 of updating the video compressor 120 and the target feature detector 140 based on the loss and the accuracy. For example, the trade-off between the bit-rate and distortion may be optimized according to Eqns. (1), (2), and (3) as described above. Moreover, the accuracy of predicting the location of the target feature may be optimized. In this way, the video compressor 120 learns how to compress medical videos 110 to minimize the bit rate and distortion, but also to maximize the accuracy of target feature detection. Thus, in some embodiments, the video compressor 120 may learn to distribute a larger proportion of bits to the location of the target features so that the target feature detector will be able to accurately detect the target feature. By preserving the quality of the most important parts of the medical video, the video compressor 120 may perform a better compression by allowing more distortion in unimportant parts.

5. Inference

After the combined compressor and detector module 210 has been trained, the combined module 210 enters an inference phase in which a subset of the steps in FIG. 7 may be performed. For example, computing the compression loss and the accuracy of the target feature prediction may no longer be performed. And, as would have been understood by a person of ordinary skill, once a set of training medical videos 110 is received, the videos may be stored for future use by the trained combined module 210.

Figure 9:
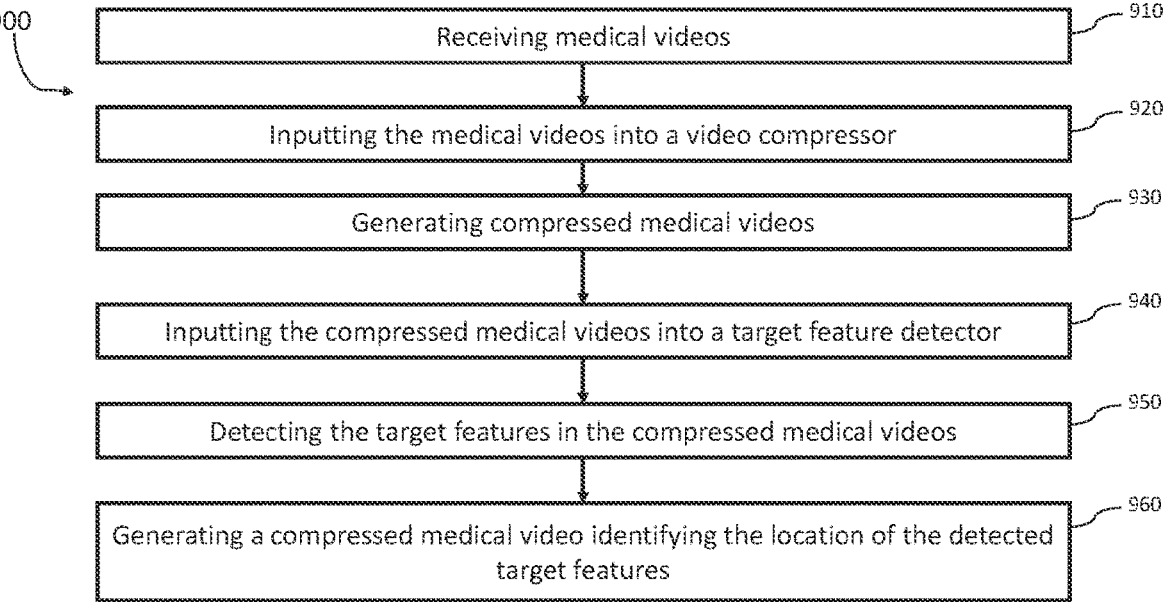
FIG. 9 is a simplified logic flow diagram illustrating an example method of inference of an example combined compressor and detector module, according to some embodiments described herein.

FIG. 9 is a flow diagram illustrating a method 900 of inference according to some aspects of the present disclosure.

Step 910 may include receiving medical videos 110. In some embodiments, the medical videos 110 may have one or more target features. In other embodiments, some of the medical videos 110 may have no target features. The medical videos are domain-specific in the sense that they are the same category of video used to train the model.

Step 920 may include inputting a medical video 110 into a video compressor 120.

Step 930 may include generating compressed medical videos 130. As described in more detail above, any appropriate type of video compressor may be used. For example, a video compression transformer or, in particular, a transformer-based temporal entropy model may be used to compress the marked medical video 110.

Step 940 may include inputting the compressed medical videos 130 into a target feature detector 140.

Step 960 may include detecting the target features, if any, in the compressed medical video 130. The target feature detector 140 may output a result, including an analyzed compressed medical video 150. As described in more detail above, the analyzed compressed marked medical video 150 output of the target feature detector 140 may be in any appropriate form. For example, in some embodiments, the target feature detector 140 may mark a box around the location it predicted as showing a target feature. Any appropriate output indicating the presence and/or location of the target features is contemplated.

A number of variations are possible on the examples and embodiments described above. Accordingly, the logical operations making up the embodiments of the technology described herein are referred to variously as operations, steps, objects, elements, components, layers, modules, or otherwise. Furthermore, it should be understood that these may occur in any order, unless explicitly claimed otherwise or a specific order is inherently necessitated by the claim language.

Generally, any creation, storage, processing, and/or exchange of user data associated with the method, apparatus, and/or system disclosed herein is configured to comply with a variety of privacy settings and security protocols and prevailing data regulations, consistent with treating confidentiality and integrity of user data as an important matter. For example, the apparatus and/or the system may include a module that implements information security controls to comply with a number of standards and/or other agreements. In some embodiments, the module receives a privacy setting selection from the user and implements controls to comply with the selected privacy setting. In some embodiments, the module identifies data that is considered sensitive, encrypts data according to any appropriate and well-known method in the art, replaces sensitive data with codes to pseudonymize the data, and otherwise ensures compliance with selected privacy settings and data security requirements and regulations.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above. Connection references, such as "attached," "coupled," "connected," and "joined" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

Additionally, the phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims.

What is claimed is:

1. A method comprising:
    receiving an uncompressed medical video comprising at least one target feature;
    compressing the uncompressed medical video to generate a compressed medical video based on a predicted location of the at least one target feature using a first pretrained machine learning model; and, detecting a location of the at least one target feature of the compressed medical video using a second pretrained machine learning model,
    wherein the first pretrained machine learning model and the second pretrained machine learning model are trained in tandem using domain-specific medical videos in a manner that, in a first iteration, a training medical video is both compressed and analyzed to detect a location of at least one training target feature before a start of a second iteration after the first iteration, and
    wherein the first pretrained machine learning model is trained to compress a first video frame differently from a second video frame, the first video frame comprising the location of at least one training target feature and the second video frame not comprising the location of at least one training target feature.

2. The method of claim 1, wherein the uncompressed medical video is obtained during a colonoscopy.

3. The method of claim 2, wherein one or more target features of the at least one target feature is a polyp.

4. The method of claim 1, wherein the first pretrained machine learning model comprises a video compression transformer.

5. The method of claim 1, wherein the second pretrained machine learning model comprises a RetinaNet detector.

6. The method of claim 1, wherein the first pretrained machine learning model is configured to allocate a larger proportion of bits to the predicted location of the at least one target feature than to other parts of the compressed medical video.

7. The method of claim 1, wherein the second pretrained machine learning model is designed to optimize an accuracy of detection of the at least one target feature.

8. The method of claim 1, wherein the first pretrained machine learning model is designed to optimize an accuracy of detection of the at least one target feature and to minimize a compression loss of the compressed medical video.

9. A system comprising:
    a memory configured to store a plurality of processor-executable instructions, the memory including:
        a video compressor based on a first pretrained machine learning model;
        a target feature detector based on a second pretrained machine learning model; and,
    a processor configured to execute the plurality of processor-executable instructions instruction to perform operations including:
        receiving an uncompressed medical video comprising at least one target feature;
        compressing the uncompressed medical video to generate a compressed medical video based on a predicted location of the at least one target feature; and,
        detecting a location of the at least one target feature of the compressed medical video,
    wherein the first pretrained machine learning model and the second pretrained machine learning model are trained in tandem using domain-specific medical videos in a manner that, in a first iteration, a training medical video is both compressed and analyzed to detect a location of at least one training target feature before a start of a second iteration after the first iteration, and
    wherein the first pretrained machine learning model is trained to compress a first video frame differently from a second video frame, the first video frame comprising the location of at least one training target feature and the second video frame not comprising the location of at least one training target feature.

10. The system of claim 9, wherein the first pretrained machine learning model comprises a video compression transformer.

11. The system of claim 9, wherein the second pretrained machine learning model comprises a RetinaNet detector.

12. The system of claim 9, wherein the second pretrained machine learning model is designed to optimize an accuracy of detection of the at least one target feature.

13. The system of claim 9, wherein the first pretrained machine learning model is designed to optimize an accuracy of detection of the at least one target feature and to minimize a compression loss of the compressed medical video.

14. A non-transitory processor-readable storage medium storing a plurality of processor-executable instructions, the plurality of processor-executable instructions being executed by a processor to perform operations comprising:

receiving an uncompressed medical video comprising at least one target feature;

compressing the uncompressed medical video to generate a compressed medical video based on a predicted location of the at least one target feature using a first pretrained machine learning model; and, detecting a location of the at least one target feature of the compressed medical video using a second pretrained machine learning model, wherein the first pretrained machine learning model and the second pretrained machine learning model are trained in tandem using domain-specific medical videos in a manner that, in a first iteration, a training medical video is both compressed and analyzed to detect a location of at least one training target feature before a start of a second iteration after the first iteration, and wherein the first pretrained machine learning model is trained to compress a first video frame differently from a second video frame, the first video frame comprising the location of at least one training target feature and the second video frame not comprising the location of at least one training target feature.

15. The non-transitory processor-readable storage medium of claim 14, wherein the first pretrained machine learning model comprises a video compression transformer.

16. The non-transitory processor-readable storage medium of claim 14, wherein the second pretrained machine learning model comprises a RetinaNet detector.

17. The non-transitory processor-readable storage medium of claim 14, wherein the first pretrained machine learning model is designed to optimize an accuracy of detection of the at least one target feature and to minimize a compression loss of the compressed medical video and the second pretrained machine learning model is designed to optimize a second accuracy of detection of the at least one target feature.

* * * * *